Patented Jan. 28, 1936

2,029,120

UNITED STATES PATENT OFFICE 2,029,120

SEPARATION OF UNSATURATED HYDROCARBONS FROM GAS MIXTURES CONTAINING THE SAME

Heinrich Schilling, Ludwigshafen-on-the-Rhine, and Robert Stadler, Ziegelhausen-on-the-Neckar, Germany, assignors to I. G. Farbenindustrie Aktiengesellschaft, Frankfort-on-the-Main, Germany No Drawing. Application December 3, 1931, Serial No. 578,844. In Germany December 10, 1930

5 Claims. (Cl. 260—170)

The present invention relates to improvements in the separation of unsaturated hydrocarbons from gas mixtures containing the same.

It has already been proposed to remove unsaturated hydrocarbons, especially acetylene, from gas mixtures containing the same, and to recover them in an enriched form by treating the gas mixtures, if desired under pressure, at room or lower temperatures with liquids such as acetone, acetonitrile or water, the dissolved gases then being expelled from the liquids by heating or reducing the pressure. The esters of carbonic acid, the esters and ethers of polyhydric alcohols of high boiling point and liquid ketones containing more than 3 carbon atoms in the molecule and boiling above 80° C. have also been proposed as solvents for the said purpose.

We have now found that the separation of unsaturated hydrocarbons especially of acetylene, from gas mixtures containing the same is advantageously carried out by washing the said gas mixtures with liquefied substances, which under atmospheric pressure are gaseous at 15° C. and liquid or solid, i. e. condensable, at a temperature above 100° below zero C. but different from those chemically converting the unsaturated hydrocarbons during the washing treatment, as for example chlorine, or those which are themselves composed of unsaturated hydrocarbons since in the latter case due to the vapor pressure of the liquid substances it would be impossible to ensure a purification of the gases from unsaturated hydrocarbons and recovering the said unsaturated hydrocarbons from the solutions thus obtained. Those substances are of particular advantage which are suitable as cooling agents for refrigerating plants, as for example liquid sulphur dioxide, ammonia, carbon dioxide, methyl chloride and ethyl chloride. The said liquid substances have an excellent solvent power for unsaturated hydrocarbons, and in particular for acetylene. The absorptive power of the said substances for unsaturated hydrocarbons is almost as great as that of acetone at the same temperatures and at 70° below zero C. exceeds that, for example of water at 10° C. by more than a hundred times. A further advantage of the process according to the present invention is that the liquids employed for washing out the unsaturated hydrocarbons may also be wholly or partly employed for the attainment of low temperatures, especially for the attainment of the low temperatures required for carrying out the washing process itself and this constitutes a considerable simplification and cheapening of the operation of the whole washing plant. The washing treatment according to the present invention may be carried out at ordinary or superatmospheric pressures. Superatmospheric pressures up to 1000 atmospheres may be employed. In case of working with carbon dioxide it is necessary to work at pressures above 15 atmospheres and at temperatures above 56° below zero C.

The vapors of the solvents which are contained in the gases leaving the washing plant may be readily recovered almost completely, especially when washing with the employment of pressure, as for example by absorption in water and expelling again. The unsaturated hydrocarbons may, if desired, be recovered in the form of compounds formed by chemical conversion with the solvent employed, for example by leading the unsaturated hydrocarbons together with a part of the solvent or the whole solvent in the gaseous phase over catalysts. For example by leading mixtures of acetylene and ammonia with an addition of steam and at a temperature of about 350° C. over zinc sulphate deposited on silica gel, nitrogeneous bases, such as pyridine are obtained. When carrying out the washing under pressure by the suitable selection of the pressures and/or temperatures in the vessels used for washing and releasing the pressure, it is readily possible for example to regulate the desired proportions of acetylene and ammonia for the further working up.

Instead of bringing the vapors of the solvents into reaction with the unsaturated hydrocarbons which have been washed out, these vapors which when evolved from the said solvents, for example by heating or releasing the pressure or both, contain part of the solvent used, such as ammonia, may be led through a liquid absorbing said solvent, as for example in the case of ammonia through dilute sulphuric acid whereby the ammonia is recovered as ammonium sulphate, while the remaining gases leave the washing plant without undergoing any chemical conversion. Contrasted with the usual solvents with the exception of water, the solvents employed in accordance with the present invention, especially sulphur dioxide and ammonia, have the advantage of being more readily available.

It has further been found that some of the said solvents are eminently suitable for splitting up mixtures of unsaturated hydrocarbons, in particular those of different degrees of saturation, or for the separate recovery of different unsaturated hydrocarbons from gas mixtures containing the same. With some of the said solvents, the ratio of the solubilities of acetylene and ethylene is greater than in the case of the liquids hitherto used which always absorb considerable amounts of ethylene in addition to the acetylene. Thus for example at 70° below zero C. the ratio of the solubilities of acetylene and ethylene in acetone is about 10, whereas in liquid sulphur dioxide it is about 15 and in liquid ammonia as much as 100. If a gas mixture containing both acetylene and ethylene is to be treated, the two constituents may be separated from each other to a great extent, for example by washing with liquid ammonia, and may be recovered in a concentrated form, the acetylene passing into solution; this has not been directly possible hitherto. For example the gas mixture may be first washed with liquid ammonia in order to dissolve the acetylene almost exclusively, and the ethylene may then be recovered in a second stage by washing with sulphur dioxide or one of the usual solvents already mentioned, as for example acetone. Alternatively, the whole of the unsaturated hydrocarbons may be first washed out together, as for example with acetone, the acetylene then being advantageously separated from the expelled gas mixture by means of liquid ammonia. Small amounts of acetylene which still remain in the high percentage ethylene fraction may be readily hydrogenated into ethylene in the usual manner. A further advantage of the employment of the said substances for the separation of unsaturated hydrocarbons consists in the fact that a very highly concentrated acetylene or ethylene may readily be obtained.

The following examples will further illustrate the nature of this invention but the invention is not restricted to these examples.

Example 1

A gas mixture containing 85 per cent of hydrogen, 10 per cent of acetylene and 5 per cent of methane is washed with liquid sulphur dioxide under a pressure of 20 atmospheres at 35° below zero C., 10 litres of liquid being allowed to act on each 5 cubic metres of gas mixture measured under normal conditions. The liquid is led from the washing tower into a degasifying vessel heated from below in which it is released from pressure and in which it is heated nearly to the boiling point of the sulphur dioxide. Frequently no special heating means or medium will be required, as the heat of the surrounding air will suffice. When operating under pressure, however, heating means may prove necessary. A gas mixture leaves the upper end of the vessel at a temperature of 30° below zero C. which contains 90 per cent of acetylene after the absorption of the sulphur dioxide contained therein in water. The gas leaving the washing tower still contains 0.4 per cent of acetylene. The liquid sulphur dioxide released from pressure and freed from gas, is wholly or partly used directly for the production of cold for the washing plant and passes through a jacket surrounding the washing tower, which is constructed as a vaporizer, back into the washing tower after heat exchange with the cold liquid. The sulphur dioxide may also be strongly cooled, without being used for the production of cold, and returned to the washing vessel.

Example 2

A mixture of 77 per cent of hydrogen, 12 per cent of acetylene, 4 per cent of ethylene and 7 per cent of methane is washed under a pressure of 9 atmospheres at 60° below zero C. first with liquid ammonia, the ammonia vapor which is carried along being removed for example by treatment with dilute sulphuric acid, and then with acetone at the same pressure and temperature, in a second washer. To each cubic meter of gas mixture measured under normal conditions, 0.6 liter of ammonia is used in the first washer and 4.5 liters of acetone in the second washer. The gas leaving the first washer still contains about 0.5 per cent of acetylene and 4.1 per cent of ethylene and the gas escaping from the second washer contains only 0.2 per cent of acetylene and 0.3 per cent of ethylene in addition to methane and hydrogen. The liquids saturated with acetylene and ethylene are released from pressure in two degasifying vessels heated from below in which the liquids are heated to near their boiling point. After heat exchange with the cold liquids they pass back into the washing towers. After absorbing the vapors of solvent from the gases escaping at a temperature of 55° below zero C. the contents of the latter in acetylene and ethylene amount to 89 per cent and 2 per cent after the first degasifying vessel and 10 per cent and 80 per cent respectively after the second degasifying vessel. The concentrated acetylene containing ammonia escaping from the first degasifying tower is led at 350° C. over silica gel laden with zinc sulphate, after the addition of steam, for the production of pyridine bases.

What we claim is:—

1. A process for the separation of acetylene from a gas mixture containing the same which comprises absorbing said acetylene in a liquefied substance which under atmospheric pressure is gaseous at 15° C. and condensable at a temperature above 100° below zero C. but different from substances chemically converting said acetylene and from substances composed of an unsaturated hydrocarbon, by washing the said gas mixture with such liquefied substance.

2. In the process as claimed in claim 1, absorbing the acetylene in liquefied sulphur dioxide.

3. In the process as claimed in claim 1, absorbing the acetylene in liquefied ammonia.

4. A process for the separation of acetylene from a gas mixture containing the same which comprises absorbing said acetylene in a liquid which is a cooling agent for refrigerating plants and which is selected from the group consisting of liquefied sulphur dioxide, ammonia, carbon dioxide, methyl chloride and ethyl chloride, by washing the said gas mixture with such liquid.

5. A process for the seperation of acetylene and a gaseous olefine from a gas mixture containing the same which comprises washing said gas mixture with liquefied ammonia at a temperature above 77° below zero C. and then washing the undissolved gas with liquid sulphur dioxide.

HEINRICH SCHILLING.
ROBERT STADLER.